(12) United States Patent
Rasmussen

(10) Patent No.: US 6,846,198 B1
(45) Date of Patent: Jan. 25, 2005

(54) CABLE DISTRIBUTION CONNECTOR

(76) Inventor: John Rasmussen, 3622 W. Western Reserve Rd., Canfield, OH (US) 44406

( * ) Notice: Subject to any disclaimer, the term of this patent is extended or adjusted under 35 U.S.C. 154(b) by 0 days.

(21) Appl. No.: 10/382,737

(22) Filed: Mar. 7, 2003

(51) Int. Cl.$^7$ ............................................. H01R 11/00
(52) U.S. Cl. ..................................................... 439/502
(58) Field of Search ................................. 439/502, 505, 439/638, 512, 514

(56) References Cited

U.S. PATENT DOCUMENTS

| | | | |
|---|---|---|---|
| 4,736,177 A | 4/1988 | Vollmer et al. | 335/299 |
| 5,340,331 A | 8/1994 | Bohlen et al. | 439/502 |
| 5,706,858 A | 1/1998 | Miyazoe et al. | 137/884 |
| 5,971,799 A | * 10/1999 | Swade | 439/502 |
| 6,500,025 B1 | * 12/2002 | Moenkhaus et al. | 439/502 |

* cited by examiner

*Primary Examiner*—Javaid H. Nasri
(74) *Attorney, Agent, or Firm*—Harpman & Harpman

(57) ABSTRACT

A multiple cable connector for use with multiple remote control devices requiring multi-poled contact connectors for each device. The connector of the invention allows for control of multiple parallel or independent devices to reduce the number of control cables required back to a central controller. Each connector is provided with a multi-pole control unit with a remote pass through interface connector head between a single female connector and associated male contact device.

10 Claims, 4 Drawing Sheets

CABLE DISTRIBUTION CONNECTOR

BACKGROUND OF THE INVENTION

1. Technical Field

This invention relates to multi-poled cabling systems in which a plurality of plug-in valving devices are used that require multi-wire cables to extend from the individual devices back to a remote central control switch for electrical activation.

2. Description of Prior Art

In modern manufacturing facilities numbers of electrically controlled electro-magnetic actuators are used in the manufacturing process. Such actuators require a multi-pole contact units including an independent ground contact and control contacts. Typically each unit has a separate multi-connector cable extending to a central activation controller. Such electromagnetic actuators are used, for example, to control multiple solenoid valve assemblies in a variety of environmental enclaves, see for example U.S. Pat. No. 5,706,858 on a solenoid valve assembly connector fastener.

In U.S. Pat. No. 4,736,177 a solenoid activator with electrical connection modules is disclosed in which a number of interchangeable connection modules can be selectively connected between encapsulated solenoid and electrically controlled inputs.

U.S. Pat. No. 5,340,331 a cabling arrangement is illustrated in which multi-lead cables and multi-poled plug-in units for connecting terminals of a central terminal box with at least two adjoining multi-poled contact units of electrically controlled activators is illustrated. Separate connector fittings interconnect to adjacent control units requiring only one four lead main cable connection sending back to a central control unit.

SUMMARY OF THE INVENTION

A multiple cable connector to provide separate and/or parallel control of interconnected independent solenoid actuators. The cable connector has a pass through female head interface that allows the male connector elements from one solenoid unit to interconnect with the corresponding common female connectors from a second solenoid via the interconnected multi-poled plug-in unit interconnected to the interface by a three lead cable there between. The connector also acts as a resilient sealing gasket between the components isolating the connectors from environmental contamination associated with its environment.

DESCRIPTION OF THE PREFERRED EMBODIMENT

Figure 1:
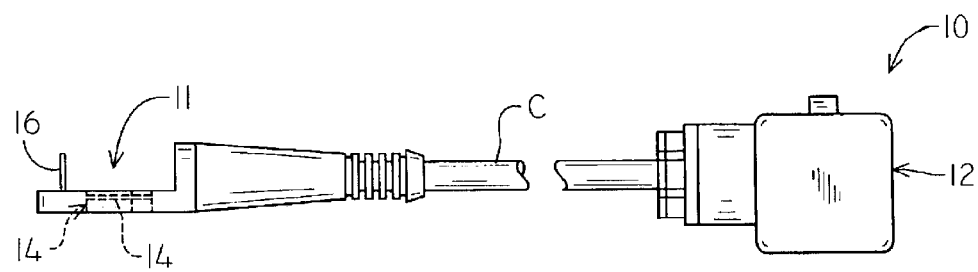
FIG. 1 is a side elevational view of the connector of the invention.
Figure 2:
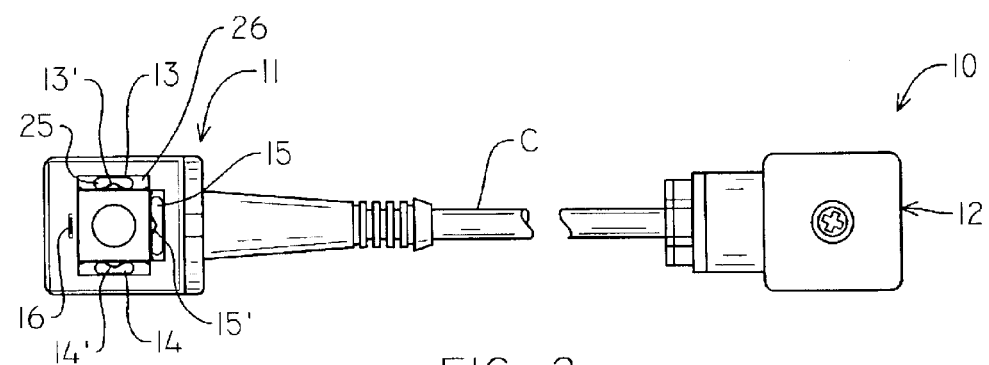
FIG. 2 is a top plan view of the connector illustrated in FIG. 1.
Figure 3:
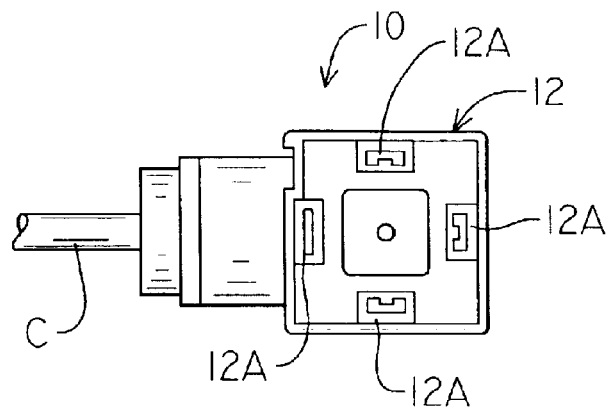
FIG. 3 is a bottom plan view of the base portion of connector illustrated in FIG. 1.

Referring to FIGS. 1–3 of the drawings, a multi-control connector 10 of the invention can be seen having a pass through interface portion 11 and a base connector portion 12. The pass through interface portion 11 has three female pass through contacts 13, 14, and 15 and a male connector pin 16 extending there from. An electrical conductive connection is established between the contacts 13–16 and the appending base connector portion 12 by means of a three lead cable C extending there between. In the primary application of the invention, two of the connectors are interconnected.

The base connector portion 12 has multiple female contact receptacles 12A of a standard DIN connector which corresponds to and provides electrical contact with a control solenoids S having corresponding three poled contact connectors 18, 19 and 20 as noted in FIG. 5 of the drawings and will be described in greater detail hereinafter.

Figure 5:
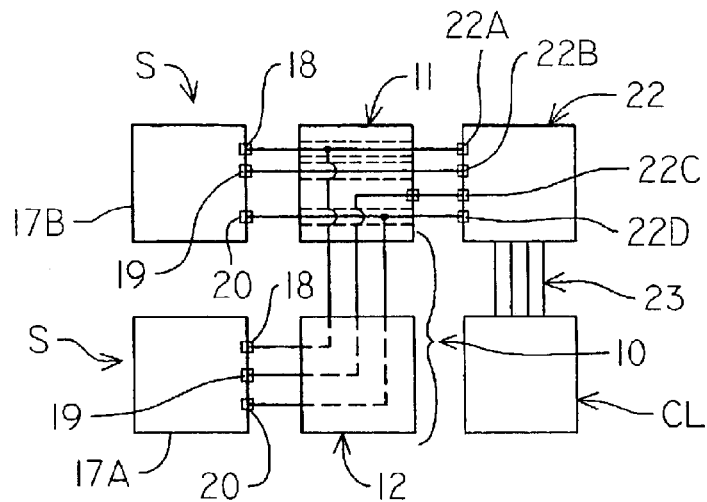
FIG. 5 is a schematic diagram of interconnected independent control valves utilizing a multi-control connector of the invention.

Referring now to FIG. 5 of the drawings, a circuit configuration is illustrated for independent control of multiple solenoid activated valving devices in which alternate activation is required. Accordingly multi-controlled solenoids 17A and 17B having respective three poled contact connectors 18–20 define specifically as ground connector 18, a safety connector 19, and a control connector 20. The base connector portion 12 of the MC connector 10 of the invention is plugged onto the control solenoid 17A with the interconnector interface portion 11 engaged over the corresponding contacts 18–10 of the solenoid 17B. The pass through design of the interface 11 allows the respective pole contact connectors 18–20 of the solenoid 17B to interconnect with both respective corresponding contact pole connectors 18 and 20 of the solenoid 17A, via the base connector 12 and a standard DIN connector 22 which in turn has a four cable lead 23 extending back to a switch box controller CL as will be well known and understood to those skilled in the art.

As noted, the pass through interface 11 of the invention has pass through female connectors 13, 14 and 15, each of which has a conductive engagement contact retainer element 13', 14' and 15' within on an integral circuit board support 26 as seen in FIG. 2 of the drawings which allows the respective three poled contact connectors 18–20 of solenoid 17B to "pass through" along with the corresponding male connector pin 16 registerably connected with the hereinbefore described DIN connector 22.

The interface 11 also acts as a sealing gasket providing an environmental isolated enclosure for interengaged connectors by its resilient composition coupled with the interdisposed pass through connectors.

Selective control of the respective solenoid 17A and 17B can therefore be achieved by the central controller CL in which a contact 22D is ground, a contact 22A is common and contacts 22B and 22C are activation control for the respective solenoid 17A and 17B.

Figure 4:
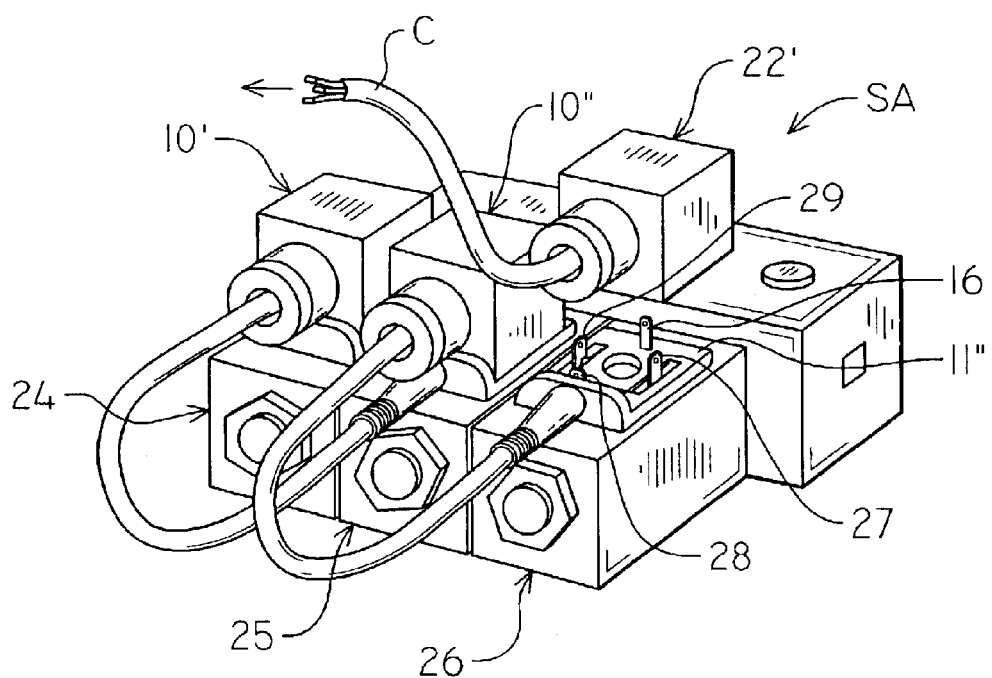
FIG. 4 is a perspective view of multi-connectors on a multi-solenoid control valve assembly.
Figure 6:
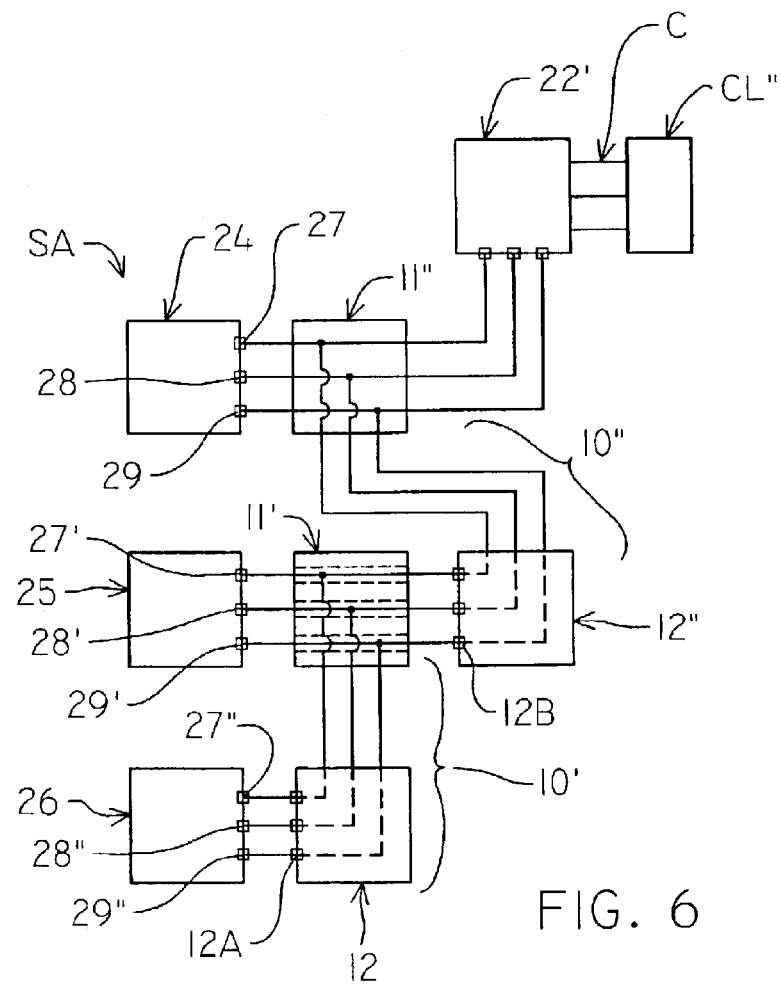
FIG. 6 is a schematic diagram of the interconnected parallel control solenoid valves using multiple control connectors of the invention.

Referring to FIGS. 4 and 6 of the drawings, a parallel i.e. simultaneous solenoid arrangement SA is illustrated in which multiple solenoids 24, 25 and 26 can be activated. (Note, since simultaneous control is desired the destination contact pin 16 of the designated interface 11 is not used as an independent control activation terminal). In FIG. 6 of the drawings, a graphic circuit illustration can be seen in which the solenoids 24, 25 and 26 each have three pole control connectors indicated respectively as connectors 27, 28 and 29; connectors 27', 28' and 29'; and connectors 27'', 28'', and 29''' for explanation purposes. In operation, a first control connector 10' of the invention interconnects solenoids 25 and 26 in the following manner. A base connector 12' is registerably engaged on the solenoid 26 pole connectors 27", 28" and 29", interconnecting them with its associated pass through interface 11'. The interface 11' is registerable on the respective pole connectors 27', 28' and 29' of the solenoid 25 passing accordingly there through. The pole connectors 27', 28' and 29' are then registerable with a base 12" of a contact connector 10" of the invention and passed through interface 11" of the contact connector 10" is registerably engaged on the solenoid 24 with corresponding contact poles 27, 28 and 29 passing there through and registering within a control DIN connector 22'. Accordingly, the control connectors 27, 28 and 29 become the control and activation elements for all three solenoids 24, 25 and 26 as hereinbefore described.

Since simultaneous control is desired in this example, control pin 16 of the respective interfaces are not activated. The DIN connector 22' is in turn connected to a switch box controller CL" as hereinbefore described.

Figure 7:
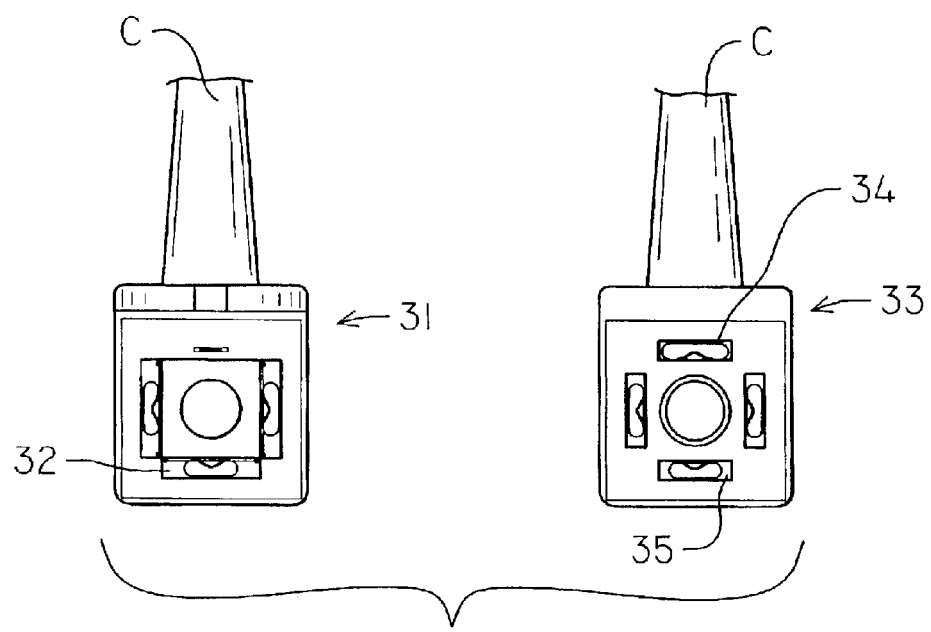
FIG. 7 is a bottom plan view of multiple alternate pass through connector elements of the invention.

In this circuit configuration, the DIN connector 22' a single three lead control cable 30 extends back to the remote switch controller CL" reducing the physical requirement of multiple return cables (not shown) heretofore required. Referring to FIG. 7 of the drawings, a variety of alternate interface ground orientation configurations are illustrated. The interface 11' as hereinbefore described illustrates a ground up orientation while alternate interfaces 31 shows a ground down at 32. Alternate interface 33 illustrates a dual ground 34 and 35.

It will be evident that the respective connecting cables C can be of varied length dependent on the application required. It will be apparent from reviewing the above referred to descriptions and examples of the invention that the contact connector 10 of the invention in its primary form will allow for a variety of single control connector configurations for either independent or parallel or simultaneous solenoid contact operation by simply its arranged orientation in relation to the solenoids and the appropriate remotely located switch controller.

Therefore I claim:

1. A multiple control connector for providing control electrical signals from a remote central controller to a plurality of electrically controlled actuators comprises, a base connector portion and an interface connector portion, said interface connector portion having a plurality of female pass through contact registration fittings, said registration fittings in communication with multiple lead connector cable carrying corresponding electrical signals to said base connector portion, said base connector portion comprises multiple female contact receptacles for conductive registration with one of said electrically controlled actuators, said interface connector portion female pass through contact registration fittings engageable over and on one of said electrically controlled actuators and in communication with said multiple contact connections of a second base portion.

2. The multiple control connector for providing control electrical signals from a remote central controller to a plurality of electrical controlled actuators of claim 1 wherein said base connector portion is in electrical communication with a central activation controller.

3. The multiple control connector for providing control electrical signals from a remote central controller to a plurality of electrically controlled actuators set forth in claim 1 wherein said a multiple connector cable including conductors corresponding to each of said contract registration fittings of said respective base and interface connector fittings, at least one shared conductor therebetween for carrying corresponding shared electrical signals and at least one remaining control conductor therebetween for carrying separate control signals for activation of said controlled actuators.

4. The multiple control connector set forth in claim 1 wherein said contact interface portion is registerable between at least one of said control actuators and said base portion of an adjacent interconnected secondary multiple control connector.

5. The multiple control connector set forth in claim 4 wherein said contact interface portion registerable between at least one of said control actuators and said base portion of an adjacent interconnected secondary multiple control connector defines an environmental seal therebetween.

6. A multiple connector for providing control electrical signals from a remote central controller to a plurality of electrically controlled actuators comprising, a base connector portion and an interface portion, said interface portion having a plurality of female pass through contact registration fittings in communication with said base portion, said base connector portion having multiple female contact receptacles for conductive registration with one of said electrically controlled actuators, said interface connector portion female pass through contact registration fittings having resilient contact retainer elements extending within respective pass through apertures for conductive registration with contact poles extending from said actuators through said pass through apertures.

7. The multiple control connector for providing control electrical signals from a remote central controller to a plurality of electrically controlled actuators of claim 6 wherein said base connector portion is in electrical communication with a central activation controller.

8. The multiple connector set forth in claim 6 wherein said base portion defines multiple receptacle insert connectors corresponding to a standard DIN connector configuration.

9. The multiple control connector set forth in claim 6 wherein said contact interface portion is registerable between at least one of said control actuators and said base portion of adjacent interconnected secondary multiple control connector.

10. The multiple control connector set forth in claim 9 wherein said contact interface portion is resiliently registerable between at least one of said control actuators and said base portion of adjacent interconnected secondary multiple control connector sealing same from environmental contamination.

* * * * *